Nov. 24, 1964  K. BURGSMUELLER  3,158,043
DEEP HOLE BORING

Filed Oct. 24, 1962  4 Sheets-Sheet 3

Inventor:
KARL H. BURGSMUELLER

ATTYS

Nov. 24, 1964

K. BURGSMUELLER 3,158,043

DEEP HOLE BORING

Filed Oct. 24, 1962

Inventor:
KARL H. BURGSMUELLER

ATTYS

United States Patent Office 3,158,043
Patented Nov. 24, 1964

3,158,043
DEEP HOLE BORING
Karl Burgsmueller, Kreiensen, Germany (% Patentanwalt Dr.-Ing. Helmut Jooss, 33 Braunschweig, Steinweg 5, near Rathaus, Germany)
Filed Oct. 24, 1962, Ser. No. 232,740
Claims priority, application Germany, Oct. 28, 1961, B 64,574
14 Claims. (Cl. 77—5)

This invention relates to deep hole boring wherein deep, blind or through holes are provided in long workpieces.

It has heretofore been customary to produce deep holes of either the blind or through type in long workpieces by utilizing a feed unit that supoprts the boring tool on the machine and is movable along a slide to serve as a carrier for the tool and tool shank to move the tool into the workpiece.

Although such systems have been extensively used, they are subject to several disadvantages. A principal disadvantage is that the boring slide carrying the tool shank requires a bed on the boring machine which has a length greater than double the length of the workpiece. Otherwise, it is necessary to shank or reclamp the tool several times. Obviously, in many instances, it is not possible to utilize such a machine because of the large space requirements. Another disadvantage is that the progressive shanking or reclamping of the tool requires work interruption, results in breakage of the tool due to re-entry in the bore, and results in damage to the surface finish of the workpiece.

It is an object of this invention to provide a method and apparatus for deep hole boring and the like which overcomes these disadvantages.

It is a further object of the invention to provide a novel tool feeding means.

It is a further object of the invention to provide such a tool feeding means which can be adapted to the normal tail stock of a lathe or the like.

It is a further object of the invention to provide such a device which can be utilized as a complete feeding package on a conventional lathe.

It is a further object of the invention to provide a novel mechanism for indicating visually the feeding of a tool into a workpiece.

Basically, the invention comprises providing on the deep hole boring machine or the like at least one pair of rolls between which a shank of a tool such as a boring bar is positioned. At least one of the rolls is driven to progressively feed the tool into the workpiece. Preferably, the rolls are spring loaded and the pressure of the rolls is adjustable. In addition, the means for feeding the rolls is controllable in speed to provide an infinitely adjustable drive.

In one preferred form, the feed rolls and associated drive mechanism form a complete package which can be mounted on a normal lathe or the like for converting the lathe to automatic feeding of the tool. In another form, the tail stock of a normal lathe is converted to provide for continuous feeding of the workpiece.

In the drawings:

FIG. 5b is a fragmentary side elevational view showing the device shown in FIG. 5a.

Figure 1:
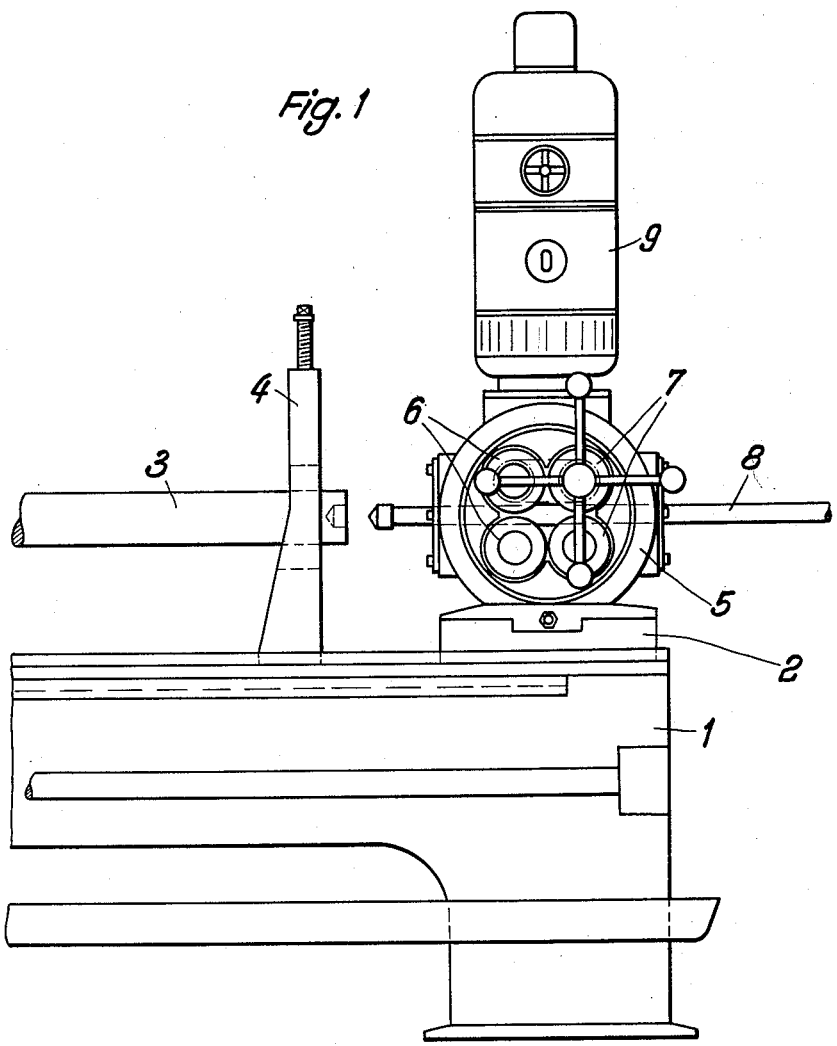
FIG. 1 is a fragmentary side elevational view of a machine embodying the invention.

Referring to FIG. 1, the bed 1 of a deep hole boring machine supports a table 2 which is slidably adjustably mounted on the bed 1 adjacent a workpiece 3 which, in turn, is normally fixed to the main spindle of the chuck or the like (not shown). The free end of the workpiece 3 is guided and located in a suitable roller steady rest 4.

The table 2 supports the tool feed mechanism which includes a generally cylindrical housing 5 in which two pairs of feed rolls 6, 7 are rotatably mounted. The feed rolls 6, 7 engage and guide the shank of a boring bar 8 along the center line of the workpiece. The rolls 6, 7 are positioned so that their axes are at right angles to the center line of the boring machine. An infinitely variable speed drive motor 9 is mounted on the housing 5 and connected to the feed rolls 6, 7 by a suitable drive mechanism.

Figure 2:
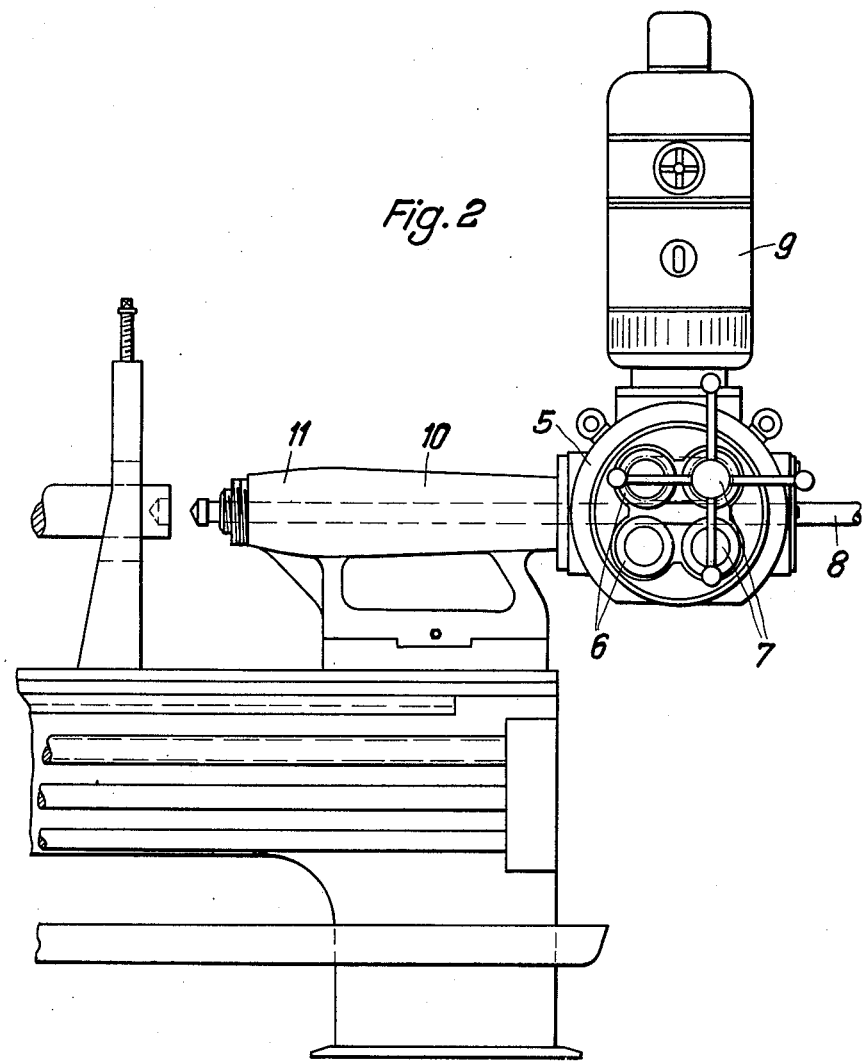
FIG. 2 is a view similar to FIG. 1 of a modified form of machine embodying the invention.

In the form of the invention shown in FIG. 2, the housing 5 is mounted on a flanged tube 10 which is carried in the bore of tail stock 11 of a conventional lathe, rather than being mounted on the table 2 shown in FIG. 1.

Figure 3:
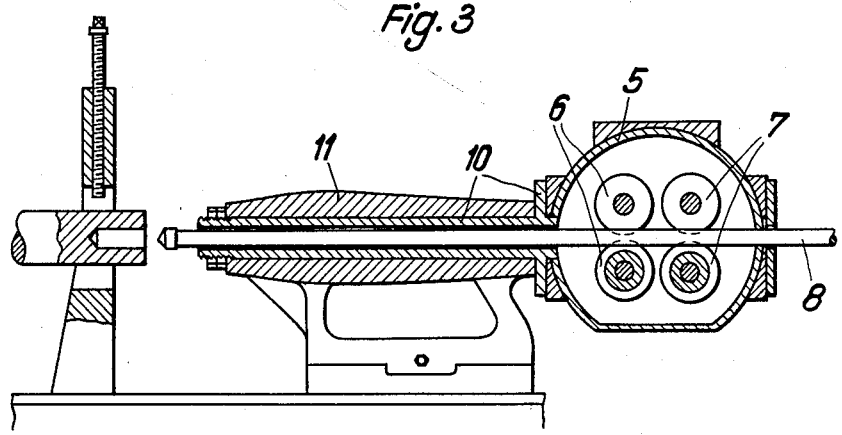
FIG. 3 is a longitudinal sectional view through the machine shown in FIG. 2.
Figure 4:
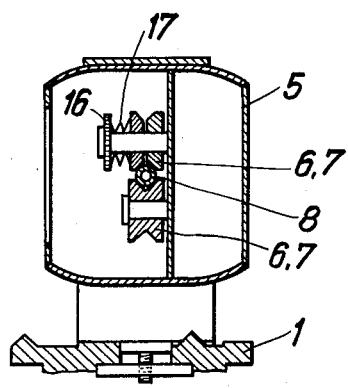
FIG. 4 is a transverse sectional view through a portion of the machine shown in FIG. 3.

The general arrangement of the parts in the form of the invention shown in FIG. 2 is indicated in FIG. 3 which is a longitudinal cross section. As shown in FIG. 4 which is a section through the housing 5 at right angles to FIG. 3, the two upper rolls 6, 7 are composed of two symmetrical parts which are held together by a tension screw 16 acting against the coil spring 17 so that the spring pressure on which tends to urge the rolls 6, 7 toward one another may be increased or decreased by a simple adjustment to regulate the pressure against the shank of the boring bar 8. The spring pressure of the rolls 6, 7 in the form of the invention shown in FIG. 1 can be similarly adjusted.

Figure 5B:
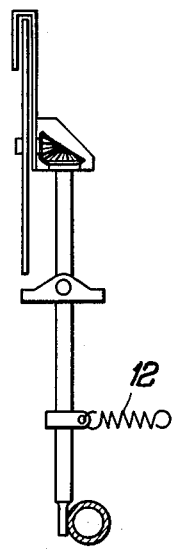
Figure 5A:
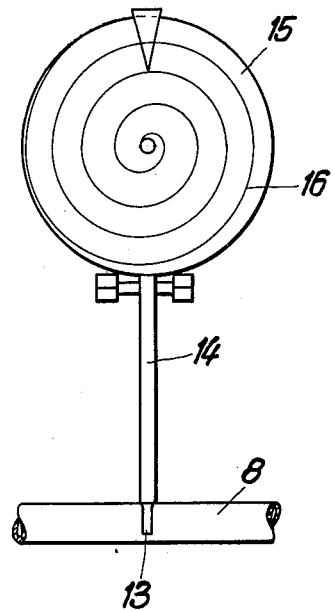
FIG. 5a is a fragmentary end elevational view showing the indicating device used in the machine.

In order to provide for readily determining the movement of the tool into the workpiece, a device is provided as shown in FIGS. 5a and 5b which comprises a drive shaft 14 that is yieldingly urged against the boring bar 8 by a tension spring 12 so that the small reduced end 13 of the drive shaft 14 is held against the boring bar 8. As the boring bar 8 is moved into the workpiece, the shaft 14 is rotated and causes through bevel gears the rotation of a circular disc 15 which is formed with a spiral 16 thereon so that the rotation thereof can be readily visually noted.

It can thus be seen that the deep hole boring machine embodying the invention requires a much shorter machine length than prior art machines. For all practical purposes, the length required is the length of the workpiece plus the workpiece carrier and the feed mechanism for the boring bar.

The control of the pressure of the feed rolls 6, 7 can be adjusted for specific conditions so that overloading can be avoided.

It can be appreciated that although the invention has been described in connection with deep hole boring machines, it is equally applicable to other machining of deep holes such as broaching, honing, reaming and drilling. It can be seen that in the form shown in FIG. 1 an independent feed package is provided whereas in the form shown in FIG. 2 the conventional tail stock is converted to provide the feed of the tool.

It can be seen that the feed roll may be equipped with a friction disc or other suitable means to assist in feeding the tool shank.

I claim:
1. The method of deep hole forming which comprises gripping and continuously rotating a workpiece,
bringing a tool into engagement with the workpiece while the workpiece is being rotated,
and progressively frictionally gripping and moving the tool into the workpiece as the workpiece is being rotated.

2. The method of deep hole forming which comprises gripping and continuously rotating a workpiece, bringing a tool into engagement with the workpiece while the workpiece is being rotated, and frictionally gripping said tool between at least one pair of opposed feed rollers, and continuously rotating said feed rolls to progressively feed said tool into said workpiece.

3. The method of deep hole boring which comprises gripping and continuously rotating a workpiece, bringing a tool into engagement with the workpiece while the workpiece is being rotated, and progressively and continuously frictionally gripping and moving the tool into the workpiece as the workpiece is being rotated.

4. The method of deep hole boring which comprises gripping and continuously rotating a workpiece bringing a tool into engagement with the workpiece while the workpiece is being rotated, and frictionally gripping said tool between spaced pairs of opposed feed rollers, and continuously rotating said feed rolls to progressively feed said tool into said workpiece.

5. In a deep hole forming machine, the combination comprising
means for rotatably supporting and rotating a workpiece,
means for frictionally gripping a tool to feed the tool into the workpiece,
whereby the said means for gripping a tool to feed the tool into the workpiece are situated very near to the front of the workpiece.

6. In a deep hole boring machine, the combination comprising means for rotatably supporting and rotating a workpiece, means for continuously frictionally gripping a tool at progressively longitudinally spaced points thereon to feed the tool into the workpiece.

7. In a deep hole boring machine, the combination comprising
means for rotatably supporting and rotating a workpiece,
a pair of opposed driven rolls for frictionally gripping and progressively moving a tool into said workpiece.

8. In a deep hole boring machine, the combination comprising
means for rotatably supporting and rotating a workpiece,
an opposed pair of rolls rotatably mounted on said machine,
and means for driving said rolls to feed a tool positioned between the rolls by friction progressively to the workpiece.

9. The combination set forth in claim 8 including means for yieldably urging at least some of said feed rolls into engagement with said tools.

10. The combination set forth in claim 8 wherein said means for driving said rolls is infinitely variable in speed.

11. The combination set forth in claim 8 wherein said rolls are mounted on a tail stock which is positioned on said machine.

12. The combination set forth in claim 8 including means adapted to engage said tool for indicating the progressive movement of said tool into said workpiece.

13. In a deep hole boring machine, the combination comprising
a frame adapted to be mounted on said machine,
at least one pair of opposed feed rolls mounted on said frame,
said rolls adapted to frictionally engage the shank of a tool,
and means for driving said feed rolls to move said tool progressively relative to the workpiece.

14. In a deep hole forming machine, the combination comprising
means for rotatably supporting and rotating a workpiece,
an opposed pair of rolls rotatably mounted on said machine,
and means for driving said rolls to feed a workpiece positioned between the rolls frictionally progressively to the workpiece.

References Cited in the file of this patent
UNITED STATES PATENTS
789,535   5/05   Glocker _____ 77—3

FOREIGN PATENTS
65,091   11/46   Denmark.
152,322   6/04   Germany.

WILLIAM W. DYER, JR., *Primary Examiner.*
JOHN C. CHRISTIE, *Examiner.*